(12) United States Patent
Sakamura et al.

(10) Patent No.: US 11,396,954 B2
(45) Date of Patent: Jul. 26, 2022

(54) ELECTROMAGNETIC VALVE SYSTEM

(71) Applicant: SMC CORPORATION, Chiyoda-ku (JP)

(72) Inventors: Naoki Sakamura, Nagareyama (JP); Koji Shiomi, Moriya (JP)

(73) Assignee: SMC CORPORATION, Chiyoda-ku (JP)

(*) Notice: Subject to any disclaimer, the term of this patent is extended or adjusted under 35 U.S.C. 154(b) by 0 days.

(21) Appl. No.: 17/050,670

(22) PCT Filed: Apr. 22, 2019

(86) PCT No.: PCT/JP2019/017006
§ 371 (c)(1),
(2) Date: Oct. 26, 2020

(87) PCT Pub. No.: WO2019/208491
PCT Pub. Date: Oct. 31, 2019

(65) Prior Publication Data
US 2021/0041035 A1 Feb. 11, 2021

(30) Foreign Application Priority Data

Apr. 27, 2018 (JP) .............................. JP2018-086503

(51) Int. Cl.
*F16K 31/06* (2006.01)
*H01F 7/06* (2006.01)
*H01F 7/08* (2006.01)

(52) U.S. Cl.
CPC ............. *F16K 31/06* (2013.01); *H01F 7/064* (2013.01); *H01F 7/081* (2013.01)

(58) Field of Classification Search
CPC ........... Y10T 137/87885; F16K 27/003; F15B 13/0817; F15B 2211/862
See application file for complete search history.

(56) References Cited

U.S. PATENT DOCUMENTS 5,222,524 A * 6/1993 Sekler ................. F15B 13/0817
137/269
5,234,033 A * 8/1993 Stoll .................... F15B 13/0814
137/884

(Continued)

FOREIGN PATENT DOCUMENTS

EP 2 620 820 A2 7/2013
JP 2001-355755 A 12/2001

(Continued)

OTHER PUBLICATIONS

International Search Report dated Jul. 9, 2019 in PCT/JP2019/017006 filed on Apr. 22, 2019, 1 page (Continued)

*Primary Examiner* — Matthew W Jellett
(74) *Attorney, Agent, or Firm* — Oblon, McClelland, Maier & Neustadt, L.L.P.

(57) ABSTRACT

In a control unit of an electromagnetic valve system, a safety circuit includes a first switch and a second switch for switching, by control from a control circuit supply and shutdown of power from a drive power supply to an electromagnetic valve drive circuit. A common line extends to a plurality of electromagnetic valve units and is connected to one end of a plurality of solenoids. A plurality of power lines are connected to the other end of each of the plurality of solenoids. The electromagnetic valve drive circuit includes a plurality of open/close switches for switching, by control from the control circuit, supply and shutdown of power to the plurality of solenoids.

5 Claims, 5 Drawing Sheets

(56) References Cited

U.S. PATENT DOCUMENTS

| | | | | |
|---|---|---|---|---|
| 5,495,871 | A | * | 3/1996 | Meloche ............. F15B 13/0817 |
| | | | | 137/560 |
| 5,887,623 | A | * | 3/1999 | Nagai ................ G05B 19/0428 |
| | | | | 137/884 |
| 6,513,547 | B2 | * | 2/2003 | Endo .................. F15B 13/0825 |
| | | | | 137/560 |
| 8,156,965 | B2 | | 4/2012 | Kremser et al. |
| 2009/0045363 | A1 | | 2/2009 | Kremser et al. |
| 2015/0069280 | A1 | * | 3/2015 | Bennek .................... H01F 7/16 |
| | | | | 251/129.15 |
| 2015/0083260 | A1 | | 3/2015 | Morikawa et al. |
| 2015/0369380 | A1 | * | 12/2015 | De Carolis ............. F16K 11/00 |
| | | | | 137/625 |
| 2021/0131459 | A1 | * | 5/2021 | Weickel ............. F16K 37/0083 |

FOREIGN PATENT DOCUMENTS

| | | | |
|---|---|---|---|
| JP | 2003-56847 | A | 2/2003 |
| JP | 2003-301966 | A | 10/2003 |
| JP | 4122495 | B2 | 7/2008 |
| JP | 2013-253693 | A | 12/2013 |

OTHER PUBLICATIONS

Combined Chinese Office Action and Search Report dated Dec. 1, 2021 in corresponding Chinese Patent Application No. 201980028613.7 (with English Translation and English Translation of Category of Cited Documents), 15 pages Extended European Search Report dated Jan. 11, 2022 in corresponding European Patent Application No. 19793462.3, 7 pages.

* cited by examiner

ELECTROMAGNETIC VALVE SYSTEM

TECHNICAL FIELD

The present invention relates to a solenoid valve system (electromagnetic valve system) including a control unit and a plurality of solenoid valve units arranged in a row with respect to the control unit.

BACKGROUND ART

U.S. Pat. No. 8,156,965 discloses a solenoid valve system in which a plurality of solenoid valve units are arranged in a row with respect to a control unit. In this solenoid valve system, control/sensor lines (control lines) run from the control unit to the plurality of solenoid valve units. Further, voltage supply lines (power lines, power-supply lines) run through the plurality of solenoid valve units. With this configuration, the solenoid valves in the plurality of solenoid valve units can be driven by supplying control signals to the plurality of solenoid valve units from the control unit through the control/sensor lines, while electric power is being supplied to the plurality of solenoid valve units through the voltage supply lines.

SUMMARY OF INVENTION

However, in the solenoid valve system, since the control/sensor lines and the voltage supply lines run inside the plurality of solenoid valve units, the control/sensor lines and the voltage supply lines may be short-circuited in the solenoid valve units.

The present invention has been devised considering such a problem, and an object of the invention is to provide a solenoid valve system that avoids short circuiting between control lines and power-supply lines in solenoid valve units.

An aspect of the invention is directed to a solenoid valve system including: a control unit; and a plurality of solenoid valve units that are arranged in a row with respect to the control unit, the plurality of solenoid valve units including solenoids configured to drive solenoid valves by supply of electric power from the control unit.

The control unit includes a safety circuit connected to a driving power supply provided externally, a solenoid valve drive circuit having an input side connected to the safety circuit and an output side connected to the plurality of solenoid valve units, and a control circuit configured to control the safety circuit and the solenoid valve drive circuit. In this case, the safety circuit includes a first switching portion configured to switch supply and shutoff of electric power from the driving power supply to the solenoid valve drive circuit, by being controlled by the control circuit.

The solenoid valve system further includes a single common line connected to one terminal of the driving power supply through the safety circuit, and extending to the plurality of solenoid valve units and connected to one end of each of the plurality of solenoids, and a plurality of power lines connected to another terminal of the driving power supply through the safety circuit and connected respectively to other ends of the plurality of solenoids. The solenoid valve drive circuit includes a plurality of second switching portions provided respectively on the plurality of power lines and configured to switch supply and shutoff of electric power from the safety circuit to the plurality of solenoids, by being controlled by the control circuit.

According to the invention, the control unit only performs power supply to the solenoids of the plurality of solenoid valve units through the common line and the power lines that are power-supply lines. That is, according to the invention, control signals are sent and received between the control circuit, and the safety circuit and solenoid valve drive circuit within the control unit, and therefore no control line for supplying control signals is provided in the plurality of solenoid valve units. As a result, it is possible to avoid short circuiting between control lines and power-supply lines in the solenoid valve units, which might occur in the technique disclosed in U.S. Pat. No. 8,156,965.

Furthermore, the first switching portion provides an interlock control on the solenoid valve drive circuit and the plurality of solenoid valve units, and the second switching portions achieve supply and shutoff of electric power to the individual solenoids. This enables the interlock control and the driving of the solenoid valves to be carried out efficiently.

Moreover, the entire solenoid valve system can be downsized because the control circuit, the safety circuit, and the solenoid valve drive circuit are contained within the control unit.

DESCRIPTION OF EMBODIMENTS

Preferred embodiments of the solenoid valve system according to the present invention will be described in detail below while referring to the accompanying drawings.

[1. Schematic Configuration of Solenoid Valve System 10]

Figure 1:
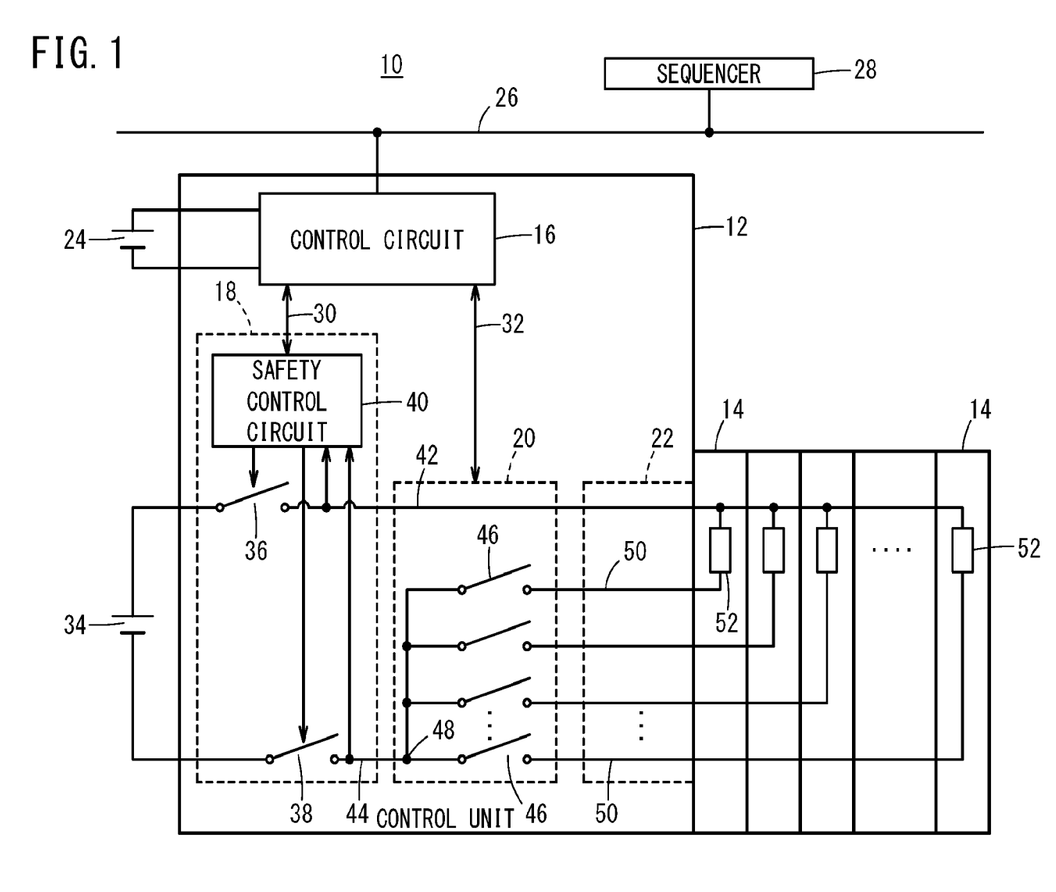
FIG. 1 is a schematic configuration diagram of a solenoid valve system according to an embodiment.

As shown in FIG. 1, a solenoid valve system 10 of an embodiment includes a control unit 12 and a plurality of solenoid valve units 14. The plurality of solenoid valve units 14 are arranged in a row with respect to the control unit 12.

The control unit 12 includes a control circuit 16, a safety circuit 18, a solenoid valve drive circuit 20, and a solenoid valve connection portion 22.

The control circuit 16 is connected to a controlling power supply 24 as an external dc power source and also to a sequencer 28 as a host device such as a PLC (Programmable Logic Controller) etc. through fieldbus 26. The control circuit 16 is also connected to the safety circuit 18 and the solenoid valve drive circuit 20 through control lines 30, 32, respectively.

The safety circuit 18, the solenoid valve drive circuit 20, and the solenoid valve connection portion 22 are provided in the control unit 12 for the purpose of supplying electric power to the plurality of solenoid valve units 14 from a driving power supply 34 as an external dc power source. In this case, the safety circuit 18, the solenoid valve drive circuit 20, the solenoid valve connection portion 22, and the plurality of solenoid valve units 14 are connected in this order in parallel with the driving power supply 34.

The safety circuit 18 includes a first switch (first switching portion) 36, a second switch (first switching portion) 38, and a safety control circuit 40. The first switch 36 is disposed on a single positive-side power line (common line) 42 that extends from a positive-side terminal (one terminal) of the driving power supply 34 to the plurality of solenoid valve units 14. The second switch 38 has its one end connected to a negative-side terminal (the other terminal) of the driving power supply 34 and its other end connected to a single negative-side power line 44. The safety control circuit 40 turns on/off the first switch 36 and the second switch 38 that serve as shutoff switches, based on a control signal supplied from the control circuit 16 through the control line 30.

The solenoid valve drive circuit 20 includes a plurality of open/close switches (second switching portions) 46. In the solenoid valve drive circuit 20, the same number of negative-side power lines 50 (power lines) as the plurality of solenoid valve units 14 branch off from a common terminal 48 of the single negative-side power line 44 connected to the second switch 38. The plurality of branching negative-side power lines 50 extend to the corresponding solenoid valve units 14, respectively. The plurality of open/close switches 46 are disposed respectively on the plurality of negative-side power lines 50 and turn on and off based on a control signal supplied from the control circuit 16 through the control line 32.

The number of the negative-side power lines 50 mentioned above is merely an example, and a larger number of negative-side power lines 50 than the plurality of solenoid valve units 14 may branch from the common terminal 48. It is then possible to easily deal with a situation where the number of the plurality of solenoid valve units 14 connected to the control unit 12 is increased or decreased. That is, a negative-side power line 50 not extending to any solenoid valve unit 14 serves as a standby power line for a newly connected solenoid valve unit 14. Two or more negative-side power lines 50 may run into a single solenoid valve unit 14. Further, if a solenoid valve unit 14 having no solenoid valve is connected to the control unit 12, a given number of negative-side power line(s) 50 may run in that solenoid valve unit 14.

The first switch 36, the second switch 38, and the plurality of open/close switches 46 can be any switching unit that turn on and off based on supply of control signals. Such switching unit includes semiconductor switching devices such as transistors etc., for example. If the positive-side power line 42 is a common line as shown in FIG. 1, then a PNP transistor may be used as the first switch 36, and NPN transistors may be used as the second switch 38 and the plurality of open/close switches 46, for example.

The solenoid valve connection portion 22 is a connecting unit such as a connector etc., through which the single positive-side power line 42 and the plurality of negative-side power lines 50 pass and which connects the control unit 12 and the plurality of solenoid valve units 14 electrically.

Each of the plurality of solenoid valve units 14 includes a solenoid 52 for driving a solenoid valve not shown. The plurality of solenoids 52 each have its positive-side terminal (one end) connected to the positive-side power line 42. The plurality of solenoids 52 each have its negative-side terminal (the other end) connected to a corresponding one of the negative-side power lines 50.

Since the plurality of solenoid valve units 14 are arranged in a row as stated above, the positive-side power line 42 extends from the positive-side terminal of the driving power supply 34 to the solenoid valve unit 14 that is most distant from the driving power supply 34. Also, each of the plurality of negative-side power lines 50 extends to a corresponding one of the solenoid valve units 14 and is connected to the negative-side terminal of the solenoid 52. FIG. 1 illustrates an example in which one solenoid valve unit 14 includes one solenoid 52, but one solenoid valve unit 14 may include two or more solenoids 52.

[2. Schematic Operations of Solenoid Valve System 10]

Next, operations of the solenoid valve system 10 of the embodiment will be described.

First, when electric power is being supplied to the control circuit 16 from the controlling power supply 24 and so the control circuit 16 is in operation, an instruction signal is supplied to the control circuit 16 from the sequencer 28 through the fieldbus 26. In this case, the instruction signal can be a signal that designates driving of any of the solenoid valves, for example.

Upon receiving the instruction signal, the control circuit 16 supplies control signals ("on" signal or "off" signal), based on the instruction signal, to the safety circuit 18 and the solenoid valve drive circuit 20 respectively through the control lines 30, 32.

Upon receiving an on signal through the control line 30, the safety control circuit 40 in the safety circuit 18 turns on the first switch 36 and the second switch 38 on the basis of the on signal. Further, the solenoid valve drive circuit 20 receives the on signal through the control line 32 and then the corresponding open/close switch 46 turns on. That is, the first switch 36, the second switch 38, and the open/close switches 46 are normally kept in an off state by an off signal that is supplied to the safety circuit 18 and the solenoid valve drive circuit 20 from the control circuit 16, and are brought into an on state from the off state by the supply of the on signal.

Then, the positive-side terminal of the driving power supply 34 is electrically connected to the positive-side terminals of the solenoids 52 of the plurality of solenoid valve units 14 through the first switch 36 and the positive-side power line 42. On the other hand, the negative-side terminal of the driving power supply 34 is electrically connected to, among the plurality of solenoid valve units 14, the negative-side terminal of the solenoid 52 that is connected to the open/close switch 46 that has been brought into the on state, through the second switch 38, the negative-side power line 44, the open/close switch 46, and the corresponding negative-side power line 50. This allows the driving power supply 34 to supply electric power to the electrically connected solenoid 52 through the safety circuit 18, the solenoid valve drive circuit 20, and the solenoid valve connection portion 22, i.e., through the positive-side power line 42 and the negative-side power lines 44, 50. As a result, the solenoid 52 supplied with electric power is excited to drive the solenoid valve corresponding to that solenoid 52.

In this way, when the solenoid valves of all solenoid valve units 14 are to be actuated, the first switch 36 and the second switch 38 are turned on and all open/close switches 46 are turned on, to thereby supply electric power to all solenoids 52 from the driving power supply 34. When only some of the solenoid valves are to be actuated, the first switch 36 and the second switch 38 are turned on, and the open/close switches 46 connected to the solenoids 52 of those solenoid valves are turned on, to thereby supply electric power to those solenoids 52 from the driving power supply 34.

During operation of the solenoid valve system 10, the control circuit 16 may notify the sequencer 28 through the fieldbus 26 about operating conditions of the safety circuit 18 and the solenoid valve drive circuit 20, i.e., driving conditions of the solenoid valves constituting the solenoid valve units 14.

When the control signal supplied to the solenoid valve drive circuit 20 from the control circuit 16 through the control line 32 changes from on signal to off signal, then the open/close switches 46 turn off. Then, the supply of electric power from the driving power supply 34 to the solenoids 52 stops, whereby driving of the solenoid valves including those solenoids 52 can be stopped.

Further, when the control signal supplied to the safety circuit 18 from the control circuit 16 through the control line 30 changes from on signal to off signal, then the first switch 36 and the second switch 38 turn off. It is thus possible to suitably perform an interlock control on the solenoid valve drive circuit 20 and the plurality of solenoid valve units 14, in cases of an abnormality of the controlling power supply 24 or the driving power supply 34 (voltage lowering) or a fault in the control unit 12 (a fault of the control circuit 16).

[3. Detailed Configuration of Control Unit 12]

Schematic configuration and schematic operations of the solenoid valve system 10 of the embodiment are as described above. Next, a detailed configuration in the control unit 12 will be described referring to FIG. 2.

Figure 2:
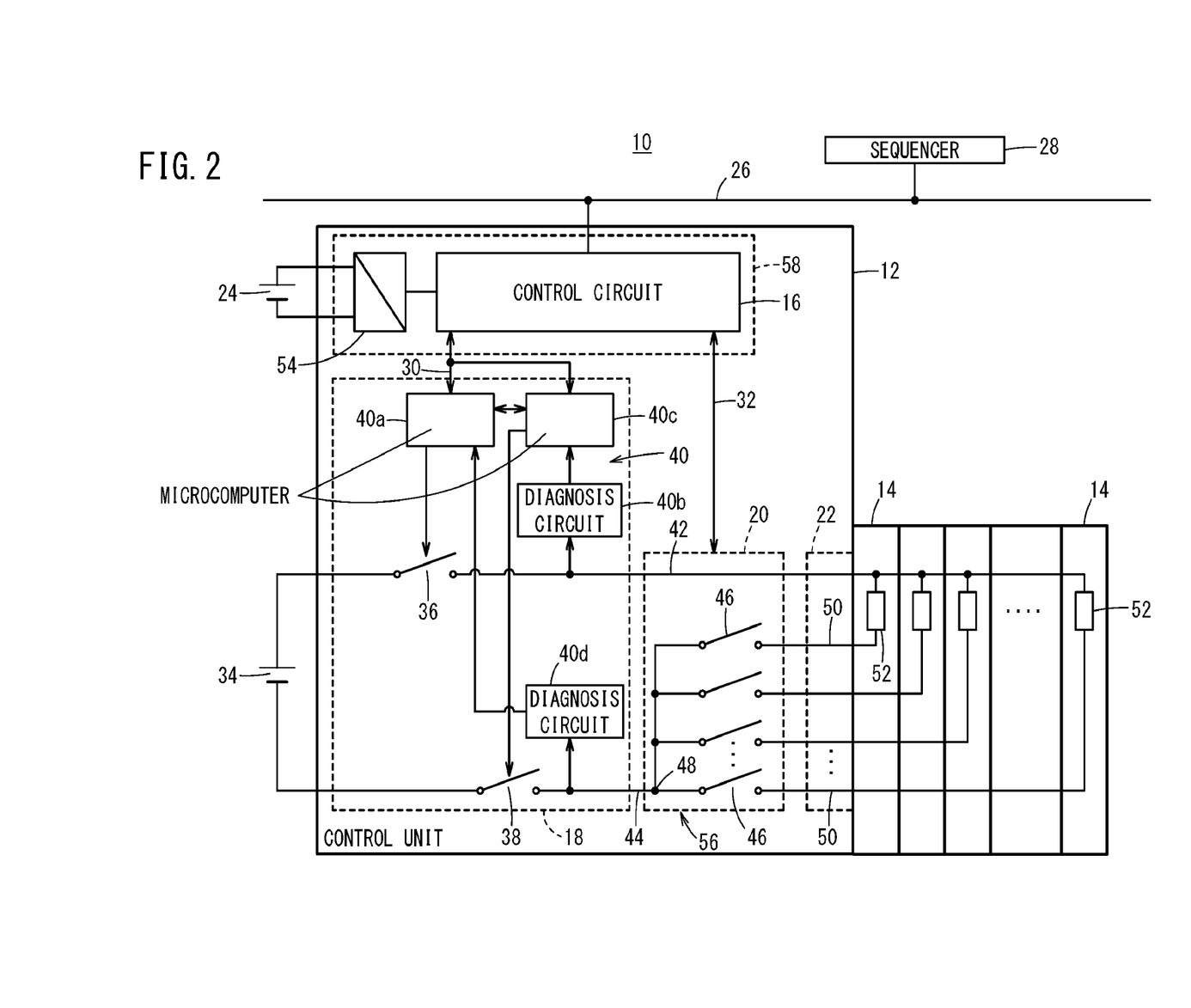
FIG. 2 is a detailed configuration diagram of the solenoid valve system of FIG. 1.

When the controlling power supply 24 and the driving power supply 34 are dc power sources with the same output voltage, the control unit 12 may further include a downconverter 54, such as a DC/DC converter etc. Then, the downconverter 54 can lower the dc voltage output from the controlling power supply 24 to the driving voltage of the control circuit 16 and supply the lowered voltage to the control circuit 16. This is because, in the control unit 12, a power-supply circuitry 56 including the safety circuit 18, the solenoid valve drive circuit 20, and the solenoid valve connection portion 22, and a control circuitry 58 including the control circuit 16, operate at voltages with different magnitudes. It is therefore desirable to, in the control unit 12, electrically insulate the control circuitry 58 and the power-supply circuitry 56 with an insulating circuit not shown.

The safety control circuit 40 further has a function of performing diagnostic testing of the control unit 12. In order to perform the diagnostic testing, the safety control circuit 40 includes a first microcomputer (first controller) 40a, a first diagnosis circuit 40b, a second microcomputer (second controller) 40c, and a second diagnosis circuit 40d.

The first microcomputer 40a turns on and off the first switch 36, based on the control signal (on signal or off signal) supplied from the control circuit 16 through the control line 30. The first diagnosis circuit 40b diagnoses the state of the positive-side power line 42 when the first switch 36 is turned on/off. The second microcomputer 40c turns on and off the second switch 38, based on the control signal supplied from the control circuit 16 through the control line 30. The second diagnosis circuit 40d diagnoses the state of the negative-side power lines 44, 50 when the second switch 38 is turned on/off. Specifically, the safety control circuit 40 performs a known pulse test to determine, for example, whether the positive-side power line 42 and the negative-side power lines 44, 50 are short-circuited with other wiring.

In the pulse test, when the first switch 36 and the second switch 38 are in the on state, the first microcomputer 40a turns off the first switch 36 for a given time, or the second microcomputer 40c turns off the second switch 38 for a given time. The first diagnosis circuit 40b detects how the potential of the positive-side power line 42 varies in the given time. The second diagnosis circuit 40d detects how the potential of the negative-side power lines 44, 50 varies in the given time.

Then, based on the change with time of the potential of the positive-side power line 42, the first diagnosis circuit 40b determines whether the positive-side power line 42 is short-circuited with other wiring (e.g., with the control lines 30, 32), or whether the first switch 36 has a fault such as sticking, and then the first diagnosis circuit 40b sends the diagnosis to the second microcomputer 40c. Further, based on the change with time of the potential of the negative-side power lines 44, 50, the second diagnosis circuit 40d determines whether the negative-side power lines 44, 50 are short-circuited with other wiring (e.g., with the control lines 30, 32), or whether the second switch 38 has a fault such as sticking, and then the second diagnosis circuit 40d sends the diagnosis to the first microcomputer 40a.

For example, after the first switch 36 was turned off, if the potential of the positive-side power line 42 promptly lowers to a given potential, e.g., zero potential etc., within a given time period, then the first diagnosis circuit 40b determines that there is no fault of the first switch 36 or no short circuit between the positive-side power line 42 and other wiring. If, after the first switch 36 was turned off, the potential of the positive-side power line 42 slowly lowers as time passes, then the first diagnosis circuit 40b determines that the potential is lowering slowly due to the capacitor component of the positive-side power line 42 etc. Further, if the lowering of the potential of the positive-side power line 42 is only slight after the first switch 36 was turned off, then the first diagnosis circuit 40b determines that the positive-side power line 42 is short-circuited with other wiring or the first switch 36 is faulty.

On the other hand, after the second switch 38 was turned off, if the absolute value of the potential of the negative-side power lines 44, 50 promptly rises from zero potential to a given potential within a given time period, then the second diagnosis circuit 40d determines that there is no fault of the second switch 38 or no short circuit between the negative-side power lines 44, 50 and other wiring. If, after the second switch 38 was turned off, the absolute value of the potential of the negative-side power lines 44, 50 slowly rises from zero potential as time passes, then the second diagnosis circuit 40d determines that the potential is rising slowly due to the capacitor component of the negative-side power lines 44, 50 etc. Further, if the rise of the absolute value of the potential of the negative-side power lines 44, 50 is only slight after the second switch 38 was turned off, then the second diagnosis circuit 40d determines that the negative-side power lines 44, 50 are short-circuited with other wiring or the second switch 38 is faulty.

The second microcomputer 40c sends, to the first microcomputer 40a, the diagnosis from the first diagnosis circuit 40b, and also sends the diagnosis to the control circuit 16 through the control line 30. Then, if the diagnosis indicates that the positive-side power line 42 is short-circuited, for example, the first microcomputer 40a turns off the first switch 36. Also, the second microcomputer 40c turns off the second switch 38. The first switch 36 might be sticking, for example, and the power supply from the driving power supply 34 can be certainly shut off by turning off the second switch 38.

On the other hand, the first microcomputer 40a sends, to the second microcomputer 40c, the diagnosis from the second diagnosis circuit 40d, and also sends the diagnosis to the control circuit 16 through the control line 30. Then, if the diagnosis indicates that the negative-side power lines 44, 50 are short-circuited, for example, the second microcomputer 40c turns off the second switch 38. Also, the first microcomputer 40a turns off the first switch 36. The second switch 38 might be sticking, for example, and the power supply from the driving power supply 34 can be certainly shut off by turning off the first switch 36.

In this way, in the configuration of FIG. 2, the first microcomputer 40a and the second microcomputer 40c can check the operating conditions with each other by exchanging the diagnosis made by the first diagnosis circuit 40b and the diagnosis made by the second diagnosis circuit 40d. As a result, it is also possible that, if one of the microcomputers has a fault, the other microcomputer can control the first switch 36 and the second switch 38.

The control circuit 16 receives the diagnosis of short circuit or fault through the control line 30, and sends the diagnosis to the sequencer 28 through the fieldbus 26. Then, the sequencer 28 notifies the user of the occurrence of short circuit or fault, whereby the user can take measures, such as maintenance/replacement etc., of the target component in the control unit 12.

The description above has illustrated short circuiting with other wiring, and a fault such as sticking of the first switch 36 or the second switch 38. The safety control circuit 40 can be configured to perform diagnosis for, for example, an abnormality of the first microcomputer 40a or the second microcomputer 40c, an abnormality of the first diagnosis circuit 40b or the second diagnosis circuit 40d, and a situation where the plurality of solenoid valve units 14 are supplied with power from the driving power supply 34 even when the first switch 36 or the second switch 38 is turned off. Further, the safety control circuit 40 may be configured also to perform diagnosis for abnormal voltage of the controlling power supply 24 or the driving power supply 34, abnormal internal temperature in the control unit 12, and abnormal signal level of the control signals supplied from the control circuit 16.

[4. Modifications of Solenoid Valve System 10]

Next, modifications (first to third modifications) of the solenoid valve system 10 of the embodiment will be described referring to FIGS. 3 to 5. In the first to third modifications, the same constituent components as those of the solenoid valve system 10 of FIGS. 1 and 2 will be labeled with the same reference numerals and will not be described in detail again.

<4. 1. First Modification>

Figure 3:
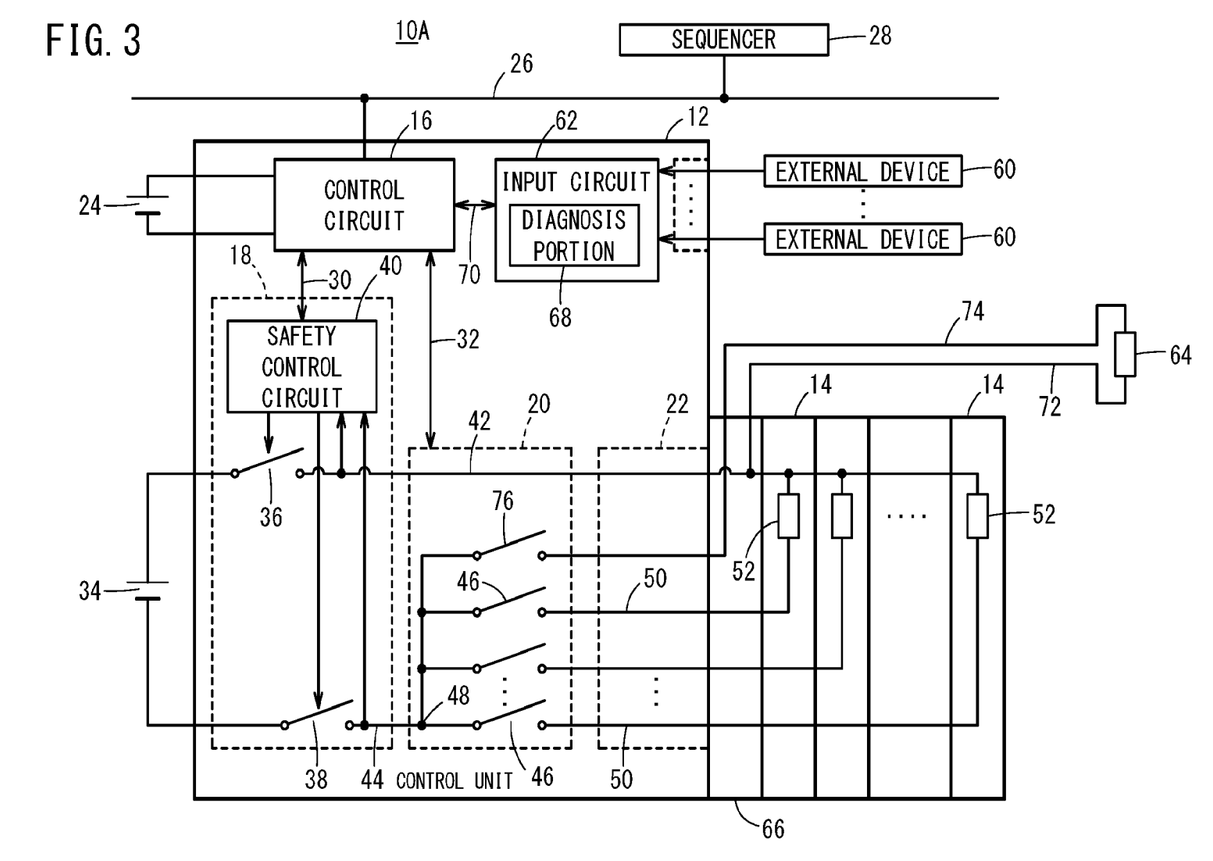
FIG. 3 is a schematic configuration diagram of a first modification of the solenoid valve system of FIG. 1.

FIG. 3 is a schematic configuration diagram of a solenoid valve system 10A of a first modification. The first modification differs from the solenoid valve system 10 of FIGS. 1 and 2 in that the control unit 12 includes an input circuit 62 that outputs signals, information, etc. input from external devices 60 to the control circuit 16 and that an external connection unit 66 connectable to a solenoid 64 of an external solenoid valve is interposed between the solenoid valve connection portion 22 and the plurality of solenoid valve units 14.

The external devices 60 can be general sensors and safety devices provided on objects to which the solenoid valve system 10A is applied (e.g., a door in a factory). Such sensors or safety devices include automatic switches, pressure sensors, push-button switches, light curtains, and so forth, for example.

The input circuit 62 includes a diagnosis portion 68 having a similar function to that of the safety control circuit 40 and is connected to the control circuit 16 through a control line 70. On the basis of a control signal supplied from the control circuit 16 through the control line 70, the diagnosis portion 68 connects the input circuit 62 and the control circuit 16, and also diagnoses whether or not the inputs from the external devices 60 are appropriate signals or information. If an input from the external device 60 is normal, the diagnosis portion 68 diagnoses the input as being valid and permits output of the signal or information to the control circuit 16. On the other hand, if the input from the external device 60 is abnormal, for example when the input from the external device 60 is not at an appropriate level due to a short circuit of wiring that connects the external device 60 and the input circuit 62, then the diagnosis portion 68 diagnoses the input as being abnormal. Then, the diagnosis portion 68 sends the diagnosis of abnormal input to the control circuit 16 and the sequencer 28, and prohibits output of the signal or information to the control circuit 16.

Further, in the solenoid valve system 10A, the positive-side power line 42 and the plurality of negative-side power lines 50 extend to the plurality of solenoid valve units 14 through the external connection unit 66. Further, an external connection power line 72 branching off from the positive-side power line 42 in the external connection unit 66 is connected to the positive-side terminal (one end) of the solenoid 64. Furthermore, an external connection power line 74 branches off from the common terminal 48 of the negative-side power line 44 and is connected to the negative-side terminal (the other end) of the solenoid 64 through the solenoid valve drive circuit 20, the solenoid valve connection portion 22, and the external connection unit 66.

In the solenoid valve drive circuit 20, an open/close switch 76 (third switching portion) is disposed on the external connection power line 74 connected to the negative-side terminal of the solenoid 64. Like other open/close switches 46, the open/close switch 76 turns on/off based on the control signal supplied from the control circuit 16 through the control line 32.

Accordingly, the solenoid valve including the external solenoid 64 can be driven by the supply of electric power to this solenoid 64 from the driving power supply 34, through the safety circuit 18, the solenoid valve drive circuit 20, the solenoid valve connection portion 22, and the external connection unit 66.

FIG. 3 shows a configuration in which the external connection unit 66 is provided between the solenoid valve connection portion 22 and the plurality of solenoid valve units 14. In the first modification, the external connection unit 66 may be provided between the plurality of solenoid valve units 14, or the external connection unit 66 may be provided on the downstream side in the direction in which the plurality of solenoid valve units 14 are coupled (on the downstream side in the direction away from the driving power supply 34).

<4. 2. Second Modification>

Figure 4:
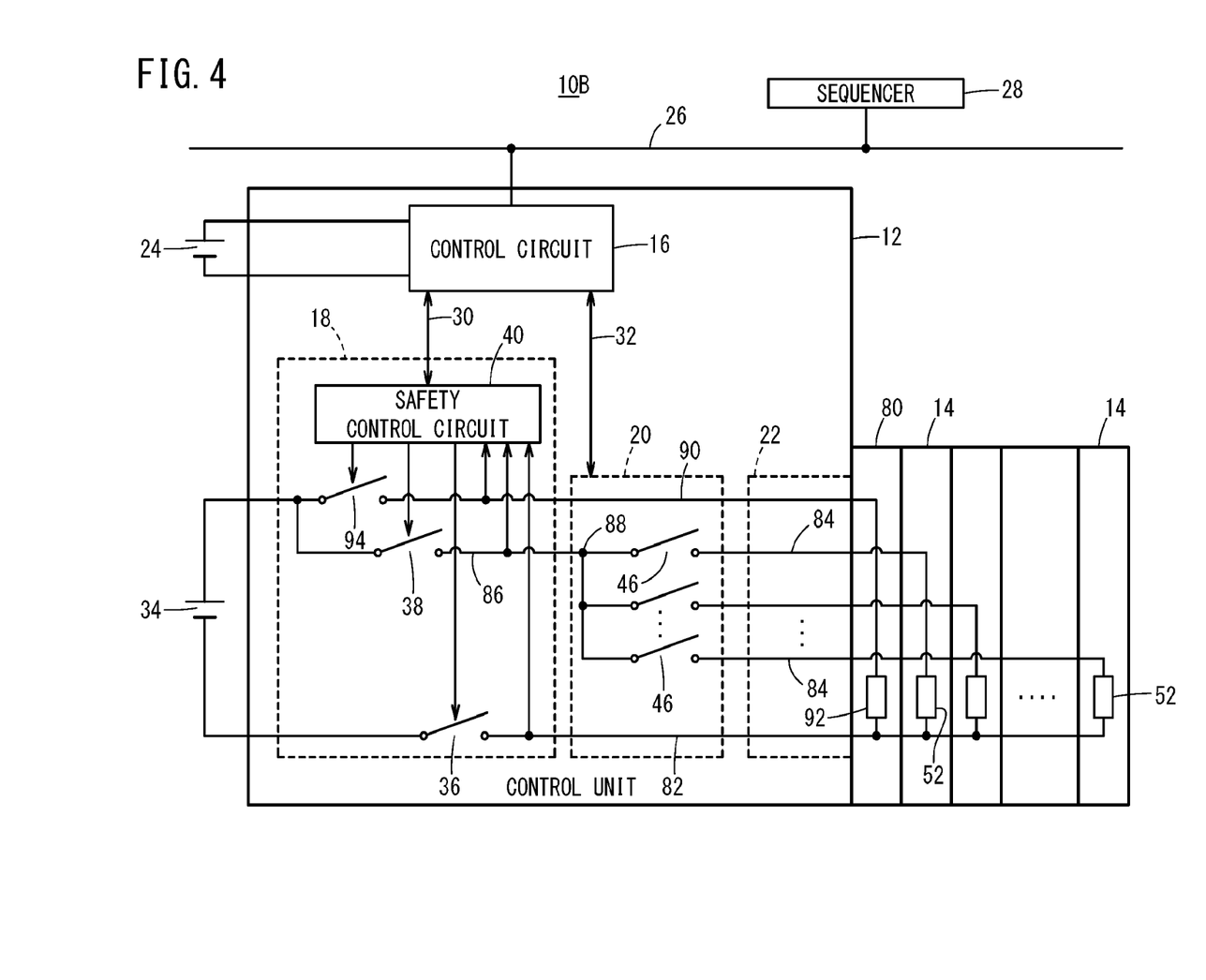
FIG. 4 is a schematic configuration diagram of a second modification of the solenoid valve system of FIG. 1.

FIG. 4 is a schematic configuration diagram of a solenoid valve system 10B according to a second modification. The solenoid valve system 10B of the second modification differs from the solenoid valve systems 10 and 10A of FIGS. 1 to 3 in that another solenoid valve unit 80 independent of the plurality of solenoid valve units 14 is connected between the solenoid valve connection portion 22 and the plurality of solenoid valve units 14, that a single negative-side power line 82 is a common line connected to the negative-side terminal (one end) of each of the plurality of solenoids 52, and that a plurality of positive-side power lines 84 are connected respectively to the positive-side terminals (the other ends) of the plurality of solenoids 52. Accordingly, note that, in the solenoid valve system 10B of the second modification, compared to the solenoid valve systems 10 and 10A of FIGS. 1 to 3, the relative arrangement and connection of the first switch 36, the second switch 38, and the plurality of open/close switches 46 between the driving power supply 34 and the plurality of solenoids 52 is exchanged between the positive electrode side and the negative electrode side.

That is, one end of the second switch 38 is connected to the positive-side terminal (the other terminal) of the driving power supply 34, and the other end thereof is connected to a positive-side power line 86. Positive-side power lines (power lines) 84 of the same number as, or a larger number than, the plurality of solenoid valve units 14 branch off from a common terminal 88 of the positive-side power line 86. Each of the plurality of branching positive-side power lines 84 is connected, for example to the positive-side terminal of the solenoid 52 of the corresponding solenoid valve unit 14. The open/close switches 46 are provided on the plurality of positive-side power lines 84, respectively.

Another positive-side power line (another power line) 90 is connected to the one end of the second switch 38, i.e., to the positive-side terminal of the driving power supply 34. The other positive-side power line 90 extends to the other solenoid valve unit 80 through the safety circuit 18, the solenoid valve drive circuit 20, and the solenoid valve connection portion 22, and is connected to the positive-side terminal of a solenoid 92 of the solenoid valve constituting the other solenoid valve unit 80.

In the safety circuit 18, a shutoff switch (fourth switching portion) 94 is disposed on the other positive-side power line 90. Thus, in the second modification, the second switch 38 and the shutoff switch 94 are connected in parallel to the positive-side terminal of the driving power supply 34. The safety control circuit 40 turns on/off the shutoff switch 94 on the basis of the control signal supplied from the control circuit 16 through the control line 30. The solenoid valve system 10B, too, can diagnose the state of the control unit 12 by turning on/off the shutoff switch 94.

The single negative-side power line 82 (common line) extends from the negative-side terminal of the driving power supply 34 to the other solenoid valve unit 80 and the plurality of solenoid valve units 14, through the safety circuit 18, the solenoid valve drive circuit 20, and the solenoid valve connection portion 22, and is connected to the negative-de terminals of the plurality of solenoids 52, 92. The first switch 36 is provided on the negative-side power line 82.

Then, in the second modification, the other solenoid valve unit 80 is a solenoid valve unit whose solenoid valve operates independently of the plurality of solenoid valve units 14. The phrase "solenoid valve operates independently of" means that the other solenoid valve can be operated irrespective of whether the second switch 38 and the plurality of open/close switches 46 are on or off.

That is, even when the first switch 36, the second switch 38, and the plurality of open/close switches 46 are in the on state, only the solenoid valve of the other solenoid valve unit 80 can be moved to the off position (stopped) by turning off the shutoff switch 94 to thereby shut off the power supply to the solenoid 92 of the other solenoid valve unit 80 from the driving power supply 34. The second modification allows solenoid valves, for example a safety exhaust valve used by the object to which the solenoid valve system 10B is applied, or other manifold solenoid valves provided externally, to operate as independent solenoid valves.

In FIG. 4, since the negative-side power line 82 is a common line, PNP transistors, for example, can be used as the plurality of open/close switches 46.

<4. 3. Third Modification>

Figure 5:
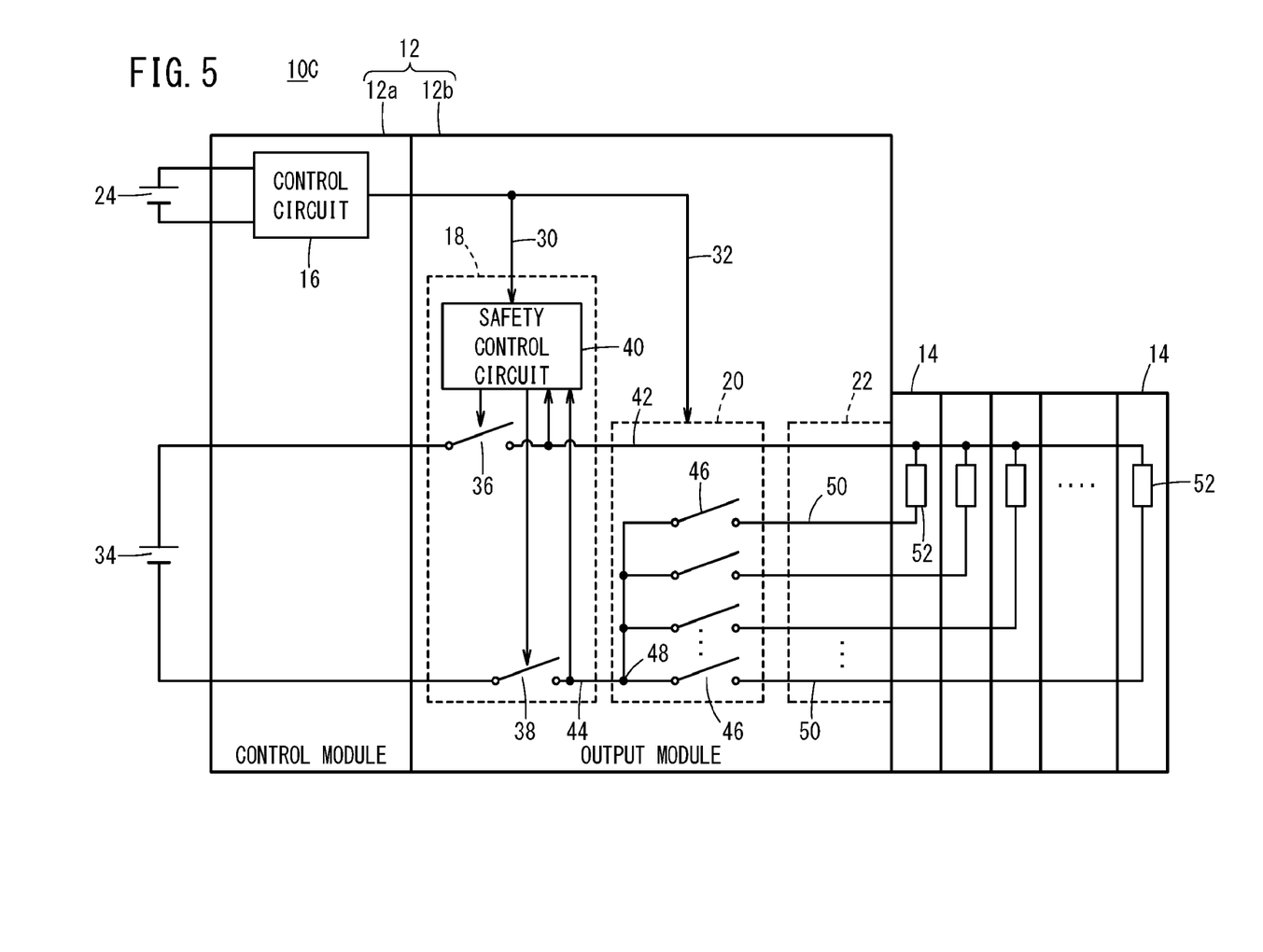
FIG. 5 is a schematic configuration diagram of a third modification of the solenoid valve system of FIG. 1.

FIG. 5 is a schematic configuration diagram of a solenoid valve system 10C according to a third modification. The third modification differs from the solenoid valve systems 10, 10A, 10B of FIGS. 1 to 4 in that the control unit 12 is formed of a control module 12a connected to the controlling power supply 24 and the driving power supply 34, and an output module 12b coupled to the plurality of solenoid valve units 14. In this case, the control module 12a includes the control circuit 16. The output module 12b includes the safety circuit 18, the solenoid valve drive circuit 20, and the solenoid valve connection portion 22.

[5. Effects of Embodiments]

As has been described above, the solenoid valve system 10, 10A to 10C of the embodiment includes the control unit 12, and the plurality of solenoid valve units 14 that are arranged in a row with respect to the control unit 12. The plurality of solenoid valve units 14 include solenoids 52 for driving solenoid valves by electric power supplied from the control unit 12.

The control unit 12 includes the safety circuit 18 connected to the driving power supply 34 provided externally, the solenoid valve drive circuit 20 having its input side connected to the safety circuit 18 and its output side connected to the plurality of solenoid valve units 14, and the control circuit 16 configured to control the safety circuit 18 and the solenoid valve drive circuit 20. In this case, the safety circuit 18 includes a first switching portion (the first switch 36, the second switch 38) for switching supply and shutoff of the electric power from the driving power supply 34 to the solenoid valve drive circuit 20, by being controlled by the control circuit 16.

The solenoid valve system 10, 10A to 10C further includes a single common line (the positive-side power line 42 or the negative-side power line 82) connected to one terminal (positive-side terminal or negative-side terminal) of the driving power supply 34 through the safety circuit 18, and extending to the plurality of solenoid valve units 14 and connected to one end (positive-side terminal or negative-side terminal) of each of the plurality of solenoids 52, and a plurality of power lines (the negative-side power lines 50 or the positive-side power lines 84) connected to the other terminal (negative-side terminal or positive-side terminal) of the driving power supply 34 through the safety circuit 18 and connected respectively to the other ends (negative-side terminals or positive-side terminals) of the plurality of solenoids 52. The solenoid valve drive circuit 20 includes a plurality of second switching portions (the open/close switches 46) that are provided respectively on the plurality of power lines and switch supply and shutoff of the electric power from the safety circuit 18 to the plurality of solenoids 52, by being controlled by the control circuit 16.

Thus, the control unit 12 only performs power supply to the solenoids 52 of the plurality of solenoid valve units 14 through the common line and power lines that are power-supply lines. That is, control signals are sent and received between the control circuit 16, and the safety circuit 18 and solenoid valve drive circuit 20 in the control unit 12, and therefore no control line for supplying control signals is provided in the plurality of solenoid valve units 14. As a result, it is possible to avoid short circuiting between control lines and power-supply lines in the solenoid valve units 14, which might occur in the technique disclosed in U.S. Pat. No. 8,156,965.

Furthermore, the first switch 36 and the second switch 38 provide an interlock control on the solenoid valve drive circuit 20 and the plurality of solenoid valve units 14, and the open/close switches 46 perform supply and shutoff of electric power to the individual solenoids 52. This enables the interlock control and the driving of the solenoid valves to be carried out efficiently.

Moreover, the entire solenoid valve system 10, 10A to 10C can be downsized because the control circuit 16, the safety circuit 18, and the solenoid valve drive circuit 20 are contained within the control unit 12.

Here, an effect of the solenoid valve systems 10, 10A to 10C will be described in more detail. If the control line 30, 32, 70 is short-circuited with a power line on one side, among the positive-side power lines 42, 84, 86, 90 or the negative-side power lines 44, 50, 82, then the power supply to the solenoid valve drive circuit 20 and the plurality of solenoid valve units 14 can be shut off by turning off the first switch 36 or the second switch 38 provided on the power line on the other side. Accordingly, existing solenoid valves, solenoid valve units, or solenoid valve manifold bases can be connected to the control unit 12 and used without any change. Further, the designer can set the solenoid valve systems 10, 10A to 10C without considering functional safety like aforementioned short circuiting etc.

The safety circuit 18 further includes the safety control circuit 40 configured to perform diagnostic testing of the control unit 12. Diagnostic testing such as pulse test etc. can thus be conducted easily. Further, because the safety control circuit 40 is incorporated in the control unit 12, there is no need to adjust the time set for the pulse test considering cable length etc. or to modify the design of the interior of the control unit 12 to adapt it to the safety control circuit 40. This improves convenience of the solenoid valve systems 10, 10A to 10C.

In this case, the first switch 36 is provided on a common line (the positive-side power line 42 or the negative-side power line 82) and the second switch 38 is provided between the other terminal of the driving power supply 34 and a plurality of power lines (the negative-side power lines 44, 50 or the positive-side power lines 84, 86). Then, the safety control circuit 40 includes a first controller (the first microcomputer 40a) configured to turn on/off the first switch 36 by being controlled by the control circuit 16, the first diagnosis circuit 40b configured to diagnose a state of the common line when the first switch 36 is turned on/off, a second controller (the second microcomputer 40c) configured to turn on/off the second switch 38 by being controlled by the control circuit 16, and the second diagnosis circuit 40d configured to diagnose a state of the plurality of power lines when the second switch 38 is turned on/off.

Thus, it is possible to perform diagnosis for a fault of the first switch 36 or the second switch 38 and a short circuit of the positive-side power line 42, 84, 86 and the negative-side power line 44, 50, 82 with other wiring (e.g. the control lines 30, 32). Further, if the diagnosis indicates that one of the first switch 36 and the second switch 38 has a fault, or that the common line or power line on which one of the switches is disposed is short-circuited, then the power supply to the solenoid valve drive circuit 20 and the plurality of solenoid valve units 14 can be shut off by turning off the other switch. It is then possible to avoid a situation where the interlock control becomes impossible.

Further, as shown in the first modification of FIG. 3, the control unit 12 further includes the input circuit 62 configured to output an input from the external device 60 to the control circuit 16, and the input circuit 62 includes the diagnosis portion 68 configured to diagnose the input from the external device 60. As a result, the solenoid valve system 10A can be designed while considering safety measures for the input from the external device 60.

Further, as shown in the first modification of FIG. 3, the external connection unit 66 connectable to the solenoid 64 of an external solenoid valve is further provided for the control unit 12. In this case, the common line (positive-side power line 42) is connected to the positive-side terminal of the solenoid 64 of the external solenoid valve through the external connection unit 66. In the solenoid valve drive circuit 20, the external connection power line 74 is further provided to connect the negative side terminal of the driving power supply 34 and the negative-side terminal of this solenoid 64 through the external connection unit 66. A third switching portion (another open/close switch 76) for switching supply and shutoff of the electric power to that solenoid 64 by being controlled by the control circuit 16 is provided on the external connection power line 74. It is thus possible to easily control the solenoid 64 of the solenoid valve provided externally.

As shown in the second modification of FIG. 4, another solenoid valve unit 80 may be further provided for the control unit 12. In this case, the common line (negative-side power line 82) is connected to the negative-side terminal of the solenoid 92 of the other solenoid valve unit 80. Further, another power line (another positive-side power line 90) is further provided to connect the positive-side terminal of the driving power supply 34 and the positive-side terminal of this solenoid 92. A fourth switching portion (the shutoff switch 94) for switching supply and shutoff of the electric power to that solenoid 92 by being controlled by the control circuit 16 is provided on the other positive-side power line 90. It is then possible to supply electric power to the solenoid 92 of the other solenoid valve unit 80 independently of the plurality of solenoid valve units 14 so as to drive the solenoid valve provided with the solenoid 92.

Further, as shown in the third modification of FIG. 5, the control unit 12 is formed of the control module 12a including the control circuit 16, and the output module 12b disposed between the control module 12a and the plurality of solenoid valve units 14 and including the safety circuit 18 and the solenoid valve drive circuit 20. Then, only the control module 12a, or only the output module 12b, can be replaced according to the specifications of the solenoid valve system 10C.

The present invention is not limited to the embodiments described above, but can of course adopt various configurations based on the disclosure in the specification.

The invention claimed is:

1. A solenoid valve system comprising: a control unit; and a plurality of solenoid valve units that are arranged in a row with respect to the control unit, the plurality of solenoid valve units including solenoids configured to drive solenoid valves by supply of electric power from the control unit,
   wherein the control unit comprises a safety circuit connected to a driving power supply provided externally, a solenoid valve drive circuit having an input side connected to the safety circuit and an output side connected to the plurality of solenoid valve units, and a control circuit configured to control the safety circuit and the solenoid valve drive circuit,
   the safety circuit comprises a first switching portion configured to switch supply and shutoff of electric power from the driving power supply to the solenoid valve drive circuit, by being controlled by the control circuit, and a safety control circuit configured to perform diagnostic testing of the control unit,
   the solenoid valve system further comprises:
   a single common line connected to one terminal of the driving power supply through the safety circuit, and extending to the plurality of solenoid valve units and connected to one end of each of the plurality of solenoids; and a plurality of power lines connected to another terminal of the driving power supply through the safety circuit and connected respectively to other ends of the plurality of solenoids, the solenoid valve drive circuit comprises a plurality of second switching portions provided respectively on the plurality of power lines and configured to switch supply and shutoff of electric power from the safety circuit to the plurality of solenoids, by being controlled by the control circuit, the first switching portion includes a first switch provided on the common line and a second switch provided between the another terminal of the driving power supply and the plurality of power lines, and the safety control circuit includes a first controller configured to turn on/off the first switch by being controlled by the control circuit, a first diagnosis circuit configured to diagnose a state of the common line when the first switch is turned on/off, a second controller configured to turn on/off the second switch by being controlled by the control circuit, and a second diagnosis circuit configured to diagnose a state of the plurality of power lines when the second switch is turned on/off.

2. The solenoid valve system according to claim 1, wherein the control unit further comprises an input circuit configured to output an input from an external device to the control circuit, and the input circuit includes a diagnosis portion configured to diagnose the input from the external device.

3. The solenoid valve system according to claim 1, wherein an external connection unit connectable to an external solenoid valve is further provided for the control unit, the common line is connected to one end of a solenoid of the external solenoid valve through the external connection unit, an external connection power line is further provided to connect the another terminal of the driving power supply and another end of that solenoid through the external connection unit, and in the solenoid valve drive circuit, a third switching portion configured to switch supply and shutoff of electric power to that solenoid by being controlled by the control circuit is provided on the external connection power line.

4. The solenoid valve system according to claim 1, wherein another solenoid valve unit is further provided for the control unit, the common line is connected to one end of a solenoid of the another solenoid valve unit, another power line is further provided to connect the another terminal of the driving power supply and another end of that solenoid, and a fourth switching portion configured to switch supply and shutoff of electric power to that solenoid by being controlled by the control circuit is provided on the another power line.

5. The solenoid valve system according to claim 1, wherein the control unit comprises a control module including the control circuit, and an output module disposed between the control module and the plurality of solenoid valve units, and the output module includes the safety circuit and the solenoid valve drive circuit.

* * * * *